United States Patent [19]

Caroc

[11] 4,306,295
[45] Dec. 15, 1981

[54] ARRANGEMENT FOR MEASURING THE RATIO BETWEEN A NUMBER OF EVENTS OCCURRING AFTER EACH OTHER IN A FIRST AND A SECOND SERIES OF EVENTS

[75] Inventor: Torben E. Caroc, Riyadh, Saudi Arabia

[73] Assignee: Telefonaktiebolaget L M Ericsson, Stockholm, Sweden

[21] Appl. No.: 75,818

[22] PCT Filed: Feb. 1, 1979

[86] PCT No.: PCT/SE79/00023
§ 371 Date: Sep. 14, 1979
§ 102(e) Date: Sep. 14, 1979

[87] PCT Pub. No.: WO79/00585
PCT Pub. Date: Aug. 23, 1979

[30] Foreign Application Priority Data
Feb. 3, 1978 [SE] Sweden ............................ 7801278

[51] Int. Cl.³ .................... G06F 7/62; G06F 15/20
[52] U.S. Cl. .......................... 364/761; 235/92 DM; 235/92 EV; 364/551; 364/569
[58] Field of Search ...................... 364/550–552, 364/554, 556, 569, 575, 734, 761–764; 235/92 MT, 92 QC, 92 CA, 92 DM, 92 EV

[56] References Cited

U.S. PATENT DOCUMENTS 3,566,096  2/1971  Schultheis, Jr. ........... 235/92 DM X
3,609,326  9/1971  Bagley et al. .................... 364/551
4,000,400 12/1976  Elder ....................... 235/92 EV X Primary Examiner—Jerry Smith
Attorney, Agent, or Firm—Hane, Roberts, Spiecens & Cohen

[57] ABSTRACT

Arrangement for measuring the ratio between a number of sequential events occurring in a first series of events and a number of events in a second series of events, each series activating a pulse generator (P1, P2) included in the arrangement. The arrangement further comprises a counter (C) which is stepped forward by the pulses generated by the pulse generator (P1) controlled by the first series of events. A multiplying arrangement (D1) receives the counter value of the counter (C) and multiplies this value by a factor m where m indicates a selected part of the received counter content. The multiplying arrangement (D1) receives on a control input, a pulse from the pulse generator (P2) controlled by the second series of events. When the arrangement (D1) receives that pulse it feeds a signal to a subtracting input of the counter (C), which signal reduces the counter content by a number of steps corresponding to the multiplication result, so that the counter content varies between two limit values. An indicating unit (I) is arranged for indicating the difference between this two limits thus showing the quotient between the number of events of the two series of events.

4 Claims, 2 Drawing Figures

ARRANGEMENT FOR MEASURING THE RATIO BETWEEN A NUMBER OF EVENTS OCCURRING AFTER EACH OTHER IN A FIRST AND A SECOND SERIES OF EVENTS

FIELD OF THE INVENTION

The present invention relates to an arrangement for measuring the ratio between a number of events occurring sequentially in a first series of events and a number of events in a second series of events, each series activating a pulse generator.

DESCRIPTION OF PRIOR ART

Measurements of statistical quantities are at present made discontinuously by counting the events on different counters which are read off and reset to zero. A restart is made either automatically or is initiated by an operator when needed. The quotients are obtained off-line by dividing such counter values. Temporary variations are equalized by this method but the quotient values of interest are updated for example only once per hour. Thus the requirement of obtaining up to the minute measuring data (quotients) as possible is badly met in such arrangements.

SUMMARY OF THE INVENTION

When supervising devices in, for example, an operating telecommunication system there is a demand for fast and continuous supervision of the condition of the devices, for example, by quotient supervision. In known systems updating of the quotient values is made at long time intervals and usually the values of the quotients are calculated in operations carried out separately, so since problems arise that the interesting quotient values are obtained too seldom.

The arrangement according to the invention, which solves this problem, is characterized as appears from the appended claims. Principally such an arrangement can be in the form of an electronic register or counter which can be both stepped forward one step at a time and reduced by a portion m of the memory content. The two operations can be initiated for example in an automatic telecommunication system by associated types of events such as the total number of calls A, and blocked calls S. Each A-event can cause incrementing by one step and each S-event can cause decrementing by a definite portion, for example 5% of the memory content. A- and S-events occur randomly in series but it can be assumed that, equalized during a certain period, a number a of A-events occurs between each S-event. The quotient of interest is thus a (or 1/a). According to the invention a counter is arranged to be stepped forward when receiving pulses from a first pulse generator and stepped down when receiving pulses from a second pulse generator. After a building-up period the counter will be stabilized about a definite value. An indicating unit is arranged showing the difference between the maximum and minimum value of the counter after stabilization, thus indicating the present quotient.

Accordingly, an object of the invention is to provide an arrangement which gives the most recent measuring data and allows the quotient between two series of events, for example the ratio between executed and blocked calls in a telephone system, to be checked continuously.

BRIEF DESCRIPTION OF THE DRAWINGS

The invention will now be explained in more detail by means of an embodiment with reference to the accompanying drawing in which.

PREFERRED EMBODIMENT

Figure 1:
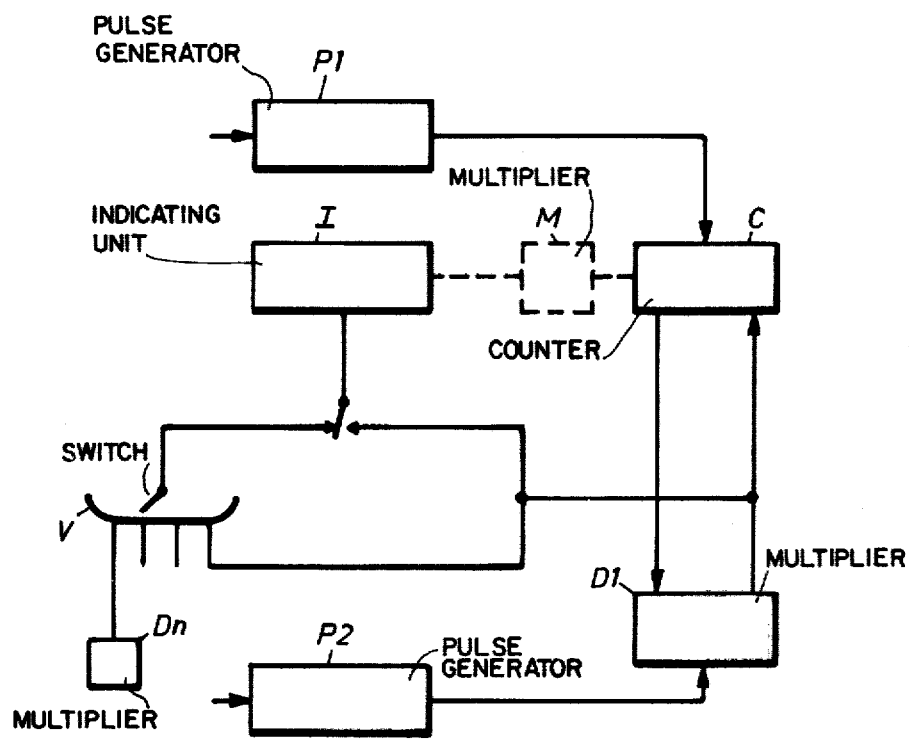
FIG. 1 is a block diagram of an arrangement according to the invention.

FIG. 1 shows a block diagram of an arrangement according to the invention. Two pulse generators P1 and P2 each associated with one series of events produce pulses for each event occurring in its associated series of events. The generator P1 produces pulses for the total number of calls and the generator P2 produces pulses for the number of blocked calls. A counter C is stepped forward for each pulse received from the pulse generator P1. A multiplying arrangement (multiplier) D1 receives the content of the counter C and multiplies this value by a factor m and feeds the result of the multiplication to a subtraction input of the counter C when the arrangement D1 receives a pulse from the pulse generator P2. The multiplying arrangement D1 multiplies the content of the counter C by a factor m which is less than 1 and the obtained result is used to reduce the content of the counter C by a corresponding number of steps. The result of the multiplying operation is also fed to an indicating unit I for continuously indicating the instantaneous quotient between the two series of events as will be explained by means of the diagram in FIG. 2. In order to enable supervision of the quotient of different series of events a number of multiplying arrangements Dn corresponding to such series of events can be read out when needed, as is symbolically indicated by a switch V. Alternatively the reading out of the quotient can be carried out by reading the output of a multiplying arrangement M which multiplies the content of the counter C by the factor m.

Figure 2:
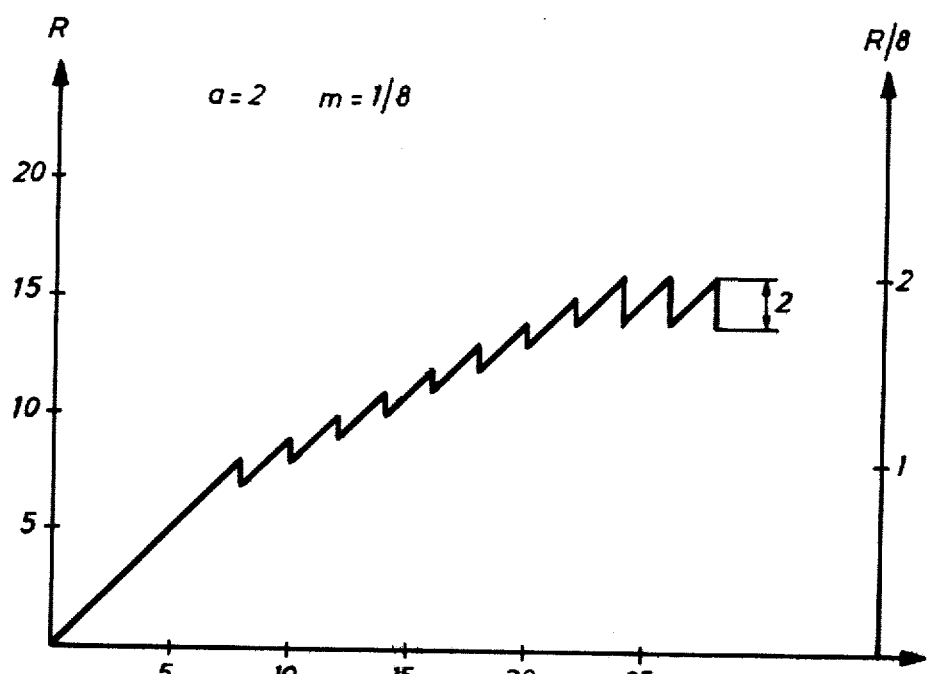
FIG. 2 is a diagram showing the building up period of the arrangement in case of a certain quotient between two series of events.

FIG. 2 is a diagram showing the content of the counter C after a building-up period. The content R of the counter will be stabilized about a definite value so that the reduction mR caused by each subtraction is balanced against the increase a accumulated between each multiplication. If the congestion in a practical case is for instance 1% this means that an average value of 100 calls (99 accepted calls +1 blocked) occurs between each case of congestion and thus a will be about 100.

If that part by which the content of the counter will be reduced, is set to m=1/16 the following relation is obtained $mR = a$ $R/16 = 100$ $R = 1600$ Thus the counter will be adjusted to the value $R = a/m$ and when reading out it is necessary to multiply the value R by the factor m in order to obtain the size of the quotient a. These conditions are difficult to represent in a diagram and therefore a much simplified example has been chosen with the values a=2 and m=½. These conditions will appear from FIG. 2.

When starting from zero and simplifying the process so that the cases of congestion are equally distributed in time, the counter, after having reached the counting position 8, will be reduced by ⅛ of its content i e 1. When reaching the counting positions 2, 4 and 6 attempts are made to reduce the counter content of ⅛ but subtractions with less than one step cannot be executed according to the above example. The content of the counter will then increase to 10. Now a reduction of the counter content occurs again which reduction in this case again will be 1. The increase of the content of the counter continues until the counting position 16 is reached. In this position the reduction of the counter content will be 2, i e ⅛ of 16, and a stabilization occurs. The quotient between the total number of calls and the number of blocked calls can now (in the stabilized state) either be read out as the difference between the highest and the lowest counting value or as the contents of the counter multiplied by the factor m. Thus it is possible to write in this example either $$a = 16 - 14 = 2 \text{ or}$$

$$14/8 \leq a \leq 16/8$$

FIG. 2 also explains the function of the arrangement according to FIG. 1. When, for example, the value of the counter C has reached 8 and has been fed to the multiplying arrangement D1 it will be multiplied by ⅛. When a pulse appears from the pulse generator P2 a signal corresponding to the multiplied value is fed to the subtracting input of the counter thus decreasing the contents of the counter by ⅛. This will continue until the counter has reached the counting position 16 whereupon the content of the counter is stabilized about this value. The indicating unit I, which is connected to the output of the multiplying arrangement D1, will show the difference between the maximum and the minimum value of the counter after stabilization, thus indicating the ratio between the total number of calls and the number of blocked calls.

By determining certain tolerance limits for the quotient it is possible to use it for controlling alarm arrangements which give an alarm when too large deviations from the quotient occur.

The above example refers to multiplying by a factor which is an integer part of the counter contents. However, it is obvious that this factor also can be an arbitrary number which is less than one.

The measuring principle can be used to establish different types of quotient, for example the disturbance ratio where the A-event is represented by a call and the S-event is represented by a disturbance, and call distribution per number area code where the A-event is represented by the total number of calls and the S-event is represented by calls to a certain numbering area code etc. The value of m can preferably be selected to any of the values ⅛, 1/16, 1/32, 1/64, i e 12.5%, 6.25%, 3.125% and 1.56% respectively. This means that multiplying by the factor m will be very simple.

I claim:

1. Apparatus for measuring the ratio between the number of events in a first series of events and the number of events in a second series of events comprising: first and second pulse generating means for generating first and second pulse signals respectively related to the events of the first and second series; counting means for accumulating a count value and having an addition input connected to said first pulse generating means, a subtraction input and an output means; multiplying means having an input connected to the output means of said counting means and an output connected to the subtraction input of said counter means and being responsive to said second pulse generating means for transmitting from the output thereof a value which is a multiple of the value at the input thereof; and indicating means connected to said counter means for indicating representations of values stored in said counter means.

2. The apparatus of claim 1 wherein said indicating means is connected to the output means of said counter means for showing the variation of the value in said counter means between two limits on a steady state basis, the difference between these limits being the quotient between the number of events of the first and second series.

3. The apparatus of claim 1 wherein said indicating means is connected to said subtraction input of said counting means for showing the subtraction value.

4. The apparatus of claim 1 further comprising multiplying means having an input connected to the output means of said counter means and an output connected to said indicating means for transferring the value stored in said counter means to said indicating means after multiplication by a predetermined value.

* * * * *